United States Patent [19]
Schroderus et al.

[11] Patent Number: 5,822,682
[45] Date of Patent: Oct. 13, 1998

[54] COMMUNICATING ON A DIRECT MODE CHANNEL

[75] Inventors: Osmo Schroderus, Sumiainen; Kimmo Kinnunen, Jyväskylä, both of Finland

[73] Assignee: Nokia Telecommunications Oy, Espoo, Finland

[21] Appl. No.: 716,407
[22] PCT Filed: Jan. 18, 1996
[86] PCT No.: PCT/FI96/00039
§ 371 Date: Sep. 20, 1996
§ 102(e) Date: Sep. 20, 1996
[87] PCT Pub. No.: WO96/22663
PCT Pub. Date: Jul. 25, 1996

[30] Foreign Application Priority Data

Jan. 20, 1995 [FI] Finland .................................... 950258

[51] Int. Cl.⁶ .................................................. H04B 1/10
[52] U.S. Cl. .......................... 455/63; 455/67.1; 455/69; 455/450; 455/522; 370/260; 370/349
[58] Field of Search ..................................... 455/522, 509, 455/515, 516, 450, 452, 455, 11.1, 15, 67.1, 67.6, 67.7, 69, 63, 454, 517; 370/260, 349, 913

[56] References Cited

U.S. PATENT DOCUMENTS

| | | | |
|---|---|---|---|
| 4,533,263 | 8/1985 | Smith et al. | 455/54 |
| 5,003,619 | 3/1991 | Morris et al. | 455/69 |
| 5,042,083 | 8/1991 | Ichikawa | 455/517 |
| 5,247,701 | 9/1993 | Comroe et al. | 455/34.4 |
| 5,390,338 | 2/1995 | Bodin et al. | 455/67.6 |
| 5,450,606 | 9/1995 | Rom | 455/69 |
| 5,515,366 | 5/1996 | Chieu et al. | 370/50 |
| 5,564,075 | 10/1996 | Grourgue | 455/69 |
| 5,666,661 | 9/1997 | Grube et al. | 455/509 |
| 5,732,077 | 3/1998 | Whitehead | 370/349 |

FOREIGN PATENT DOCUMENTS

| | | |
|---|---|---|
| 330 166 | 8/1989 | European Pat. Off. . |
| 663 737 | 7/1995 | European Pat. Off. . |
| 93/16566 | 8/1993 | WIPO . |
| 95/01679 | 1/1995 | WIPO . |
| 95/15666 | 6/1995 | WIPO . |
| 95/26613 | 10/1995 | WIPO . |

Primary Examiner—Nguyen Vo
Assistant Examiner—Darnell R. Armstrong
Attorney, Agent, or Firm—IP Group of Pillsbury Madison & Sutro LLP

[57] ABSTRACT

A method for communicating on a direct mode channel on which there is at least one communicating first radio unit, and a second radio unit which is equipped with a memory and which seeks to communicate on the direct mode channel with an intended transmit power. According to the method, the first radio unit is transmitting on the direct mode channel, and includes information in its transmission on the transmit power it is using, a second radio unit monitors the transmissions on the direct mode channel, and receives the transmission of the first radio unit, and stores in its memory the information on the transmit power contained in the transmission of the first radio unit, the second radio unit measures the quality of the transmission of the first radio unit, and stores the information characterizing the quality in its memory, the second radio unit compares the quality and transmits power information of the first radio unit to the transmit power it intends to use for transmitting signals, and as a result of the comparison infers whether it can start transmitting on the direct mode channel.

19 Claims, 3 Drawing Sheets

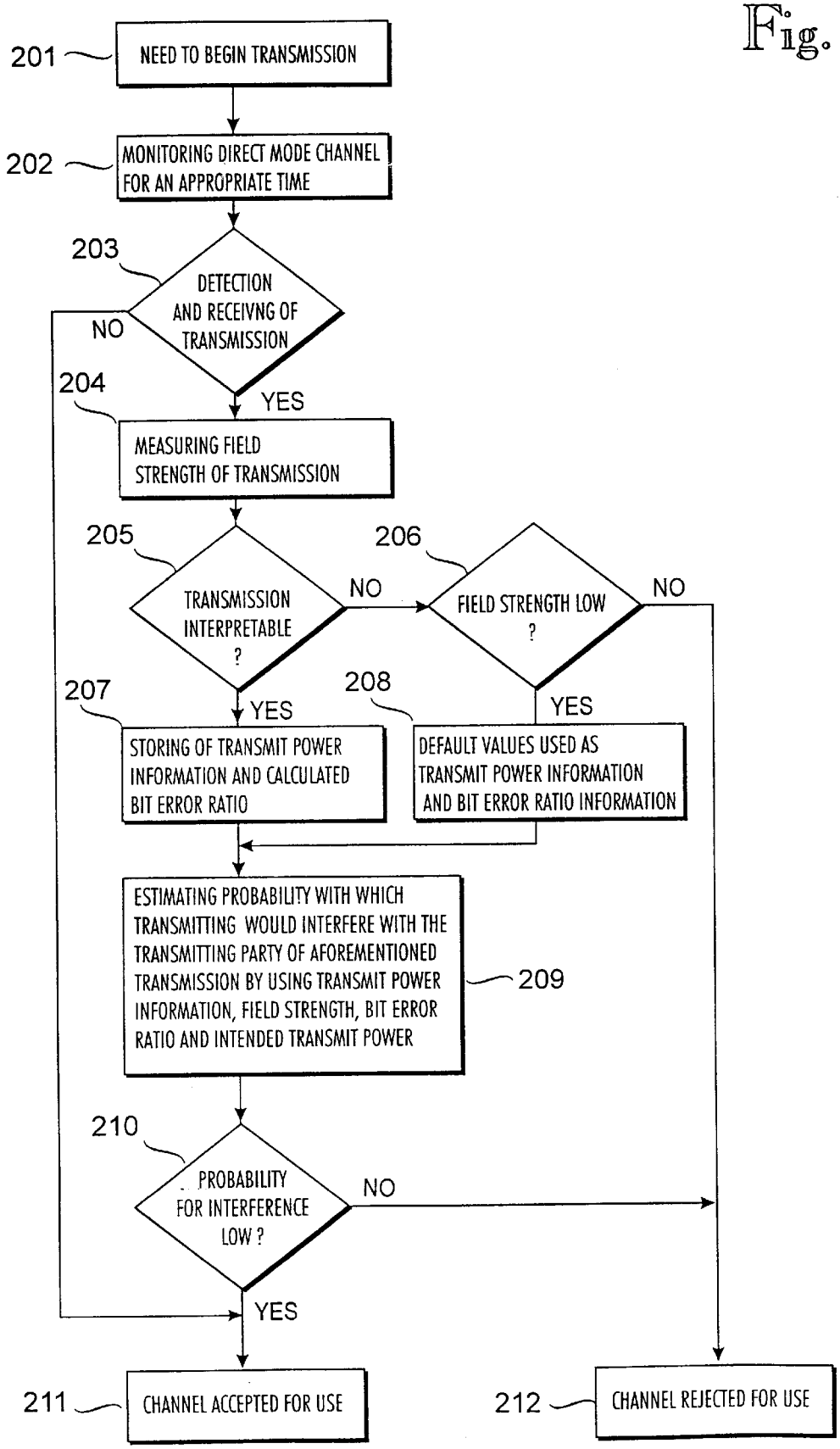

COMMUNICATING ON A DIRECT MODE CHANNEL

This application claims benefit of international application PCT/Fl96/00039 filed Jan. 18, 1996.

FIELD OF THE INVENTION

The present invention relates to a method for communicating on a direct mode channel on which there is at least one communicating first radio unit, and a second radio unit which is equipped with a memory and which seeks to communicate on the direct mode channel with an intended transmit power.

BACKGROUND OF THE INVENTION

The invention relates to the field of mobile phone systems. A subscriber in a mobile phone system, i.e. a subscriber station, for instance a mobile phone or a mobile station, may be registered in a radio network or system, whereby it communicates with the radio network via system channels comprised of control and traffic channels maintained by the base stations of the radio network.

In addition to the system channels in mobile phone systems, so-called direct mode channels can also be used in connection with a radio system, i.e. direct mode operation is applied. Subscriber stations using direct mode operation do not communicate directly with the radio network or its base stations. Direct mode channels are frequencies on which mobile phones or other means of communication are able to communicate directly with each other without the system, or via repeater stations either with the base stations of the system or with other mobile stations.

Direct mode channels are typically used in situations where, for instance, a group of portable mobile phones are communicating with each other at such a long distance from the base station that system channels cannot be used.

Another important way of using direct mode channels is to increase the capacity when the traffic in the system increases fast in some part of the service area of the system, for instance in some point-like part of the radio network.

A direct mode channel is referred to with the terms direct or simplex channel, or a simplex connection. A direct mode channel is a channel which is typically not at all used by the system. For example, it may be a channel with the same channel spacing as the channels of the system, for instance 12,5 kHz or 25 kHz. Among the mobile phones operating on a direct mode channel, the transmitting station has tuned its transmitter onto the channel and transmits speech or data information. The other mobile phones set to direct mode operation have tuned their receivers onto the same channel, whereby they are able to directly hear the transmission.

Operation on a direct mode channel may take place on the analog or digital modulation principle. A mobile phone transmitting on the channel may also transmit signalling information, such as information on rights of use and priorities or on the group operating on the channel. On the direct mode channel, an encryption may be carried out or plain speech can be transmitted.

Subscriber stations using direct mode operation communicate with other subscriber stations on a direct mode channel without necessarily being in direct contact with the base stations of the radio network.

One of the forms of a direct mode channel is represented by a direct mode channel equipped with a repeater, where, in addition to subscriber stations, there is a separate repeater station which forwards traffic between subscriber stations using the direct mode channel. Such a repeater station exemplifies one type of a radio unit. In such a case, semi-duplex mode of operation is employed on the direct mode channel. This makes it possible for subscriber stations employing the direct mode operation to communicate with the radio network via the repeater stations as well.

In prior art mobile phones capable of direct mode operation, the random access mechanism employed is very simple, resting entirely upon the use of a tangent by the users. When the tangent (i.e. a Push To Talk button, PTT) of a radio unit is pressed by its user, it transmits a signal onto the direct mode channel, i.e. to the radio path. Naturally, the pressing of the tangent may be represented by a signal supplied by a speech detector.

One method for distributing transmit turns on the direct mode channel is that the radio unit which has desired a transmit turn on the direct mode channel monitors the quality of signals transmitted on the direct mode channel, and on the basis of the monitoring it concludes whether the direct mode channel is free for the respective radio unit to transmit. One of such methods is disclosed in the PCT application WO95/266/3 (PCT/FI95/00150).

A problem concerning the prior art solution is simultaneous transmission by the first and second radio units: in most cases, this leads to the signals of both the radio units being destroyed or becoming corrupt, with the result that the transmission from neither of the units reaches its destination.

For the above reason, the efficiency of channel use according to prior art solutions is obviously not very high, because the systems waste radio path capacity.

SUMMARY OF THE INVENTION

It is an object of the present invention to solve the problems concerning the prior art solutions.

It is an object of the invention to provide a method, i.e. a protocol, by which an accidental overlapping of transmissions of radio units, e.g. subscriber stations, communicating on a direct mode channel can be prevented.

It is an object of the invention to improve the efficiency of channel (i.e. frequency) use of radio units communicating on direct mode channels.

It is an object of the invention to enable operation on a direct mode channel so that it is possible to estimate as accurately as possible the probability with which the transmission of the radio unit does not interfere with another radio unit, such as a mobile station, already communicating on the direct mode channel.

By means of the invention, an attempt is made to decrease the likelihood of transmissions from two or more radio units to collide on the radio path. It is a further object of the invention to improve the re-use of the direct mode channel, that is, to make it possible to use the same radio channel at an ever shorter geographical distance from a similar channel.

A method according to the invention for communicating on a direct mode channel is characterized in that a first radio unit is transmitting on said direct mode channel, and includes information in its transmission on the transmit power it is using, a second radio unit monitors the transmissions on the direct mode channel, and receives the transmission of the first radio unit, and stores in its memory the information on the transmit power contained in the transmission of the first radio unit, the second radio unit measures the quality of the transmission of the first radio unit, and stores the information characterizing the quality in its memory, the second radio unit compares the quality and transmit power information of the first radio unit to the transmit power it intends to use for transmitting signals, and as a result of the comparison infers whether it can start transmitting on said direct mode channel.

In addition, the invention relates to a radio unit communicating on a direct mode channel, the radio unit comprising: a transceiver unit for communicating with other radio units, a control unit, a user interface and a memory means.

The radio unit of the invention is further characterized in that it additionally comprises a quality monitoring means responsive to signals transmitted by other radio units for monitoring the quality of transmissions of the other radio units, and for producing information proportional to the quality, and for determining the transmit power of the other radio units on the basis of their transmission, and comparing means responsive to the monitoring means for comparing the quality and transmit power of transmissions received from the other radio units to the transmit power the radio unit intends to use, and on the basis of the comparison for inferring whether the radio unit can begin to transmit its signals on the direct mode channel.

The invention further relates to a radio unit communicating on a direct mode channel, the unit comprising: a transceiver unit for communicating with other radio units, a control unit, and a user interface. The radio unit of the invention additionally comprises means for including information in its transmissions on the power level it is using, whereby other radio units receiving the radio unit transmissions infer, in response to the transmit power level information, whether the other radio units can begin to transmit their respective transmissions on the direct mode channel.

The invention is based on the idea that the mobile stations operating according to the method on a direct mode channel include information in their transmission on the power level they employ. The receiving party of the transmission is able to utilize this information together with the quality information of the received signal in evaluating the quality of the connection on the direct mode channel, as well as its usability for the communication of the receiving party. The quality of the transmission is represented by, e.g., the strength of the received signal, a value representing bit error ratio, and message error ratio.

The idea of the invention is to include the transmit power information in the transmissions of the radio unit, and to extract the information from received transmissions, and its utilization with other criteria normally used, such as field strength, bit error ratio and message error ratio, which are employed for examining the usability of the direct mode channel for starting communication. In addition, when examining the usability of the direct mode channel, the intended transmit power, in relation to the transmit power level information received, is employed. The aim in such a case is to estimate how probable it is that the transmission will interfere with the transmitting party of the transmission received when a known transmit power is being employed.

It is an advantage of such a method for distributing transmit turns between radio units communicating on a direct mode channel, and the radio unit, that the present invention solves the problems of the prior art solutions. The method and radio unit according to the invention enable radio communication for a larger number of radio units on a direct mode channel without the transmissions of the radio units accidentally overlapping on the direct mode channel. In this way, it is made sure that the transmission of no one radio unit be destroyed. In short, the method and radio unit according to the invention enable controlling the transmit turns of mobile phones on a direct mode channel so that the transmissions of the radio units do not interfere with one another.

A further advantage of the invention is that the controlled method for distributing transmit turns guarantees a more reliable method for communicating on a direct mode channel than would a transmitting principle based on the users' free choice.

Furthermore, the controlled method for distributing transmit turns provides a better channel use efficiency as a result of the messages transmitted onto the radio path not destroying easily, and therefore repeated attempts to transmit the same message via the direct mode channel become unnecessary.

A further advantage of the invention, above all from the point of view of channel re-usability, is the fact that by employing the method it is possible to detect that the transmission of the radio unit probably does not interfere with a second mobile station already using the radio channel. This means that the radio unit may begin to transmit without causing interference to other radio units.

Yet another advantage of the invention is that the geographical re-use distance of the same channel can be shorter than what could be achieved by the prior art methods.

BRIEF DESCRIPTION OF THE DRAWINGS

In the following, the invention will be described in closer detail with reference to the accompanying drawings, in which:

FIG. 2 is a flow chart illustrating the operation of the method according to the invention.

DETAILED DESCRIPTION OF THE INVENTION

The invention determines a method and a radio unit operating in accordance with the method, such a radio unit being for example a subscriber station or a mobile station which operates according to the method of the invention and wants to transmit signalling or speech on the direct mode channel, i.e. in direct mode operation. This leads to the radio unit being given a transmit turn by a mechanism which is controlled by a random access method, with the aim that the interference caused by the transmission of the radio unit to other mobile phones remain as weak as possible.

Figure 1:
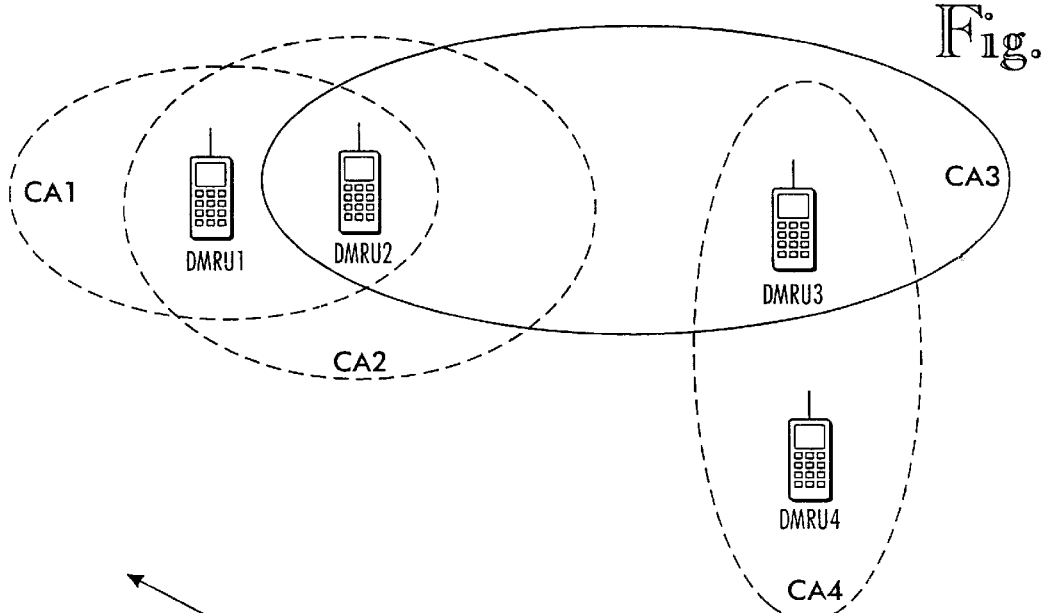
FIG. 1 illustrates radio units according to the invention communicating on a direct mode channel.

FIG. 1 shows radio units DMRU1, DMRU2, DMRU3 and DMRU4 (DMRU=Direct Mode Radio Unit) according to the invention communicating on a direct mode channel. The radio units may be mobile stations or any other elements equipped with a radio device, capable of communicating on a direct mode channel. The radio units may also be repeater stations of a mobile communication system. When a second radio unit DMRU2 operating in accordance with the invention wants to transmit its transmission onto the direct mode channel, the radio unit DMRU2 checks whether there are signals exceeding a specific quality requirement on the channel already, for example signals of the first radio unit DMRU3. The quality of a signal or transmission present on the direct mode channel is represented by, for example, the field strength, the bit error ratio or the message error ratio of the signal. The bit error ratio refers to the ratio Ne/No, in which No signifies the number of bits received, and Ne is the number of such bits out of all the bits received, in which the error detection method has detected an error. Correspondingly, the message error ratio refers to the ratio $N_E/N_O$, in which $N_O$ is the number of messages received, and $N_E$ is the number of such messages out of all the messages received, in which the error detection method has detected an error of at least one bit. Naturally, the quality of the signal, particularly its field strength, correlates with the distance between the radio units communicating on the direct mode channel.

In the invention, the second radio unit DMRU2 monitors the quality of the transmission that is being transmitted on the direct mode channel by utilizing the criteria described in the above paragraph and the threshold values related to the criteria.

The following describes FIG. 1 and the steps of the flow chart in connection with FIG. 2. In the situation of FIG. 1, the same direct mode channel is used by the mobile stations DMRU1, DMRU2, DMRU3 and DMRU4. Out of these, DMRU3 and DMRU4 have an existing connection so that DMRU3 is transmitting, and thus forms a coverage area CA3, illustrated by an unbroken line. The coverage areas CA1, CA2, and CA4 are areas which would be formed if the radio units DMRU1, DMRU2 and DMRU4 were transmitting their respective transmissions. The transmission of DMRU3 is directed to DMRU4, which hears it. In step 201 of FIG. 2, the intention is to employ the second radio unit DMRU2 for communicating to DMRU1 by using the same direct mode channel.

Before DMRU2 can begin communication, it must be made certain that the direct mode channel is available for communication, i.e. that no other radio unit (DMRU3) is communicating in the time slot on the direct mode channel. The second radio unit DMRU2 examines the channel according to the method disclosed below.

In step 202, the second radio unit (DMRU2) monitors the direct mode channel for a time long enough to detect the transmissions of other radio units DMRU3, which are possibly communicating on the direct mode channel.

Upon detecting 203 a transmission from another radio unit (that of DMRU3 in this case), DMRU2 measures 204 the field strength of the DMRU2 transmission, and analyzes 205 the transmission. If the transmission is impossible to analyze, the following two facts might be the reason: the transmission is encrypted, or very weak 206. If the field strength of the transmission is sufficient, but performing the analysis still proves to be impossible, the reason is an unknown encryption, and therefore the channel is not worth using 212. If the analysis to the transmission fails due to poor quality of the transmission, default values for the bit error ratio and for the transmit power level may be introduced 208, whereby the process proceeds to step 209, in which probability is calculated for the fact that the transmission of the radio unit interferes with the transmitting party of the transmission received.

The probability calculation described above is preceded by a step in which the second radio unit DMRU2 analyzes 205 the transmission it has received, and stores 207 the information contained in it on the transmit power used for the transmission. The radio unit, i.e. the radio unit DMRU2 in this example, has at its disposal the following information for examining the usability of direct mode communication:

1. The field strength of the transmission received,
2. The transmit power that was used for transmitting the transmission received, and
3. The transmit power to be used in the transmission of the radio unit.

In step 209, the second radio unit infers, on the basis of information mentioned above, a probability for the transmission of the radio unit to attenuate to a sufficiently low level as it propagates to the transmitting party in order for the transmission not to interfere with the transmission of the radio unit DMRU3 that was transmitting first, in case the transmitting radio unit were to use its known transmit power.

If the calculated probability indicates that it is more probable that the transmission of the radio unit does not interfere with another radio unit already using the direct mode channel, the channel can be declared free 211 for communication. Otherwise, the channel will be found to be reserved 212, and unsuitable for communication by the radio unit.

Figure 3:
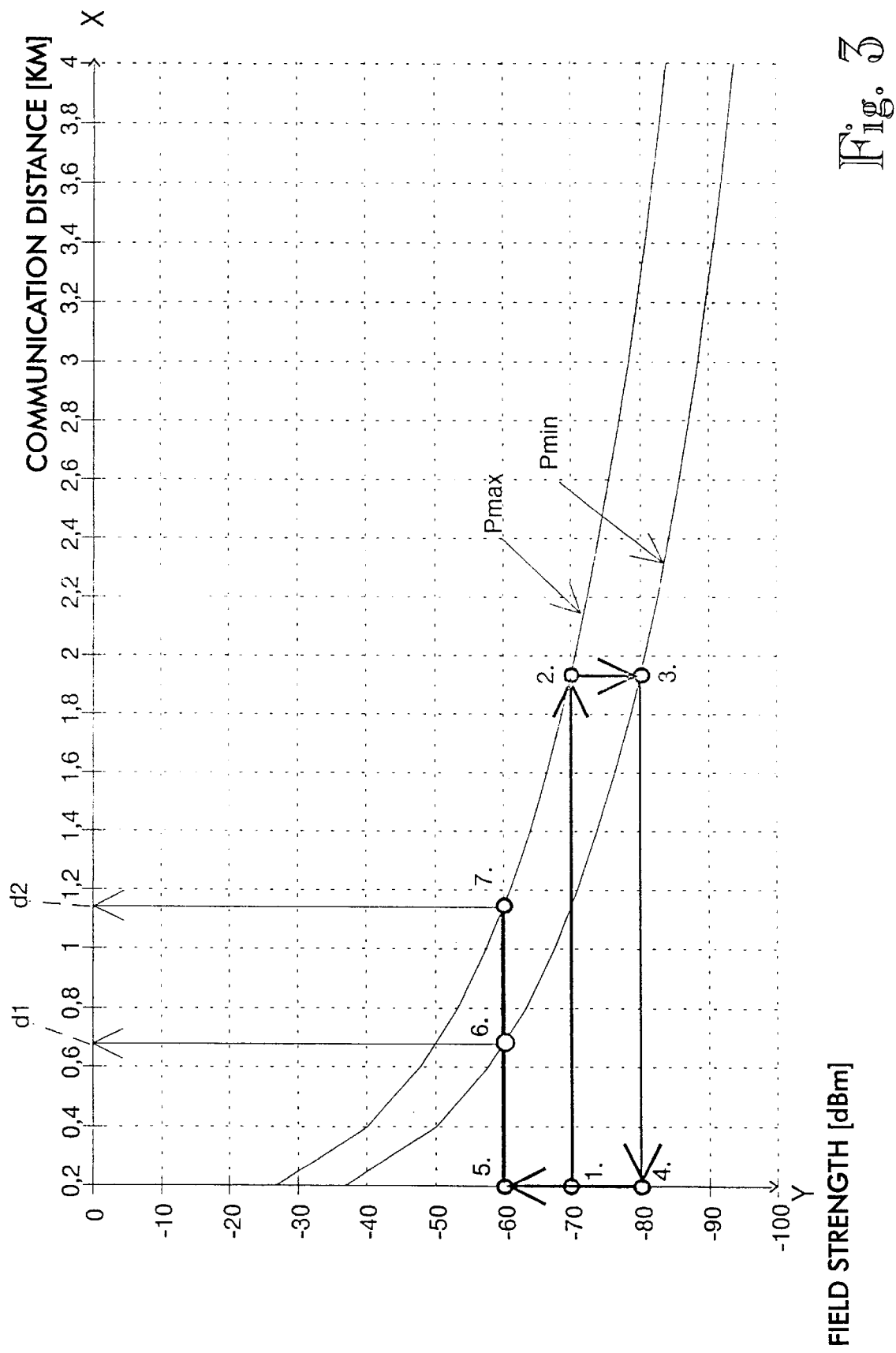
FIG. 3 shows a field strength and distance chart, according to which the radio unit of the invention makes the decision whether to transmit on the direct mode channel or not.

FIG. 3 shows a field strength and distance chart, which the radio unit according to the invention follows in making the decision whether to transmit onto the direct mode channel or not. The chart illustrates transmission power levels allowed for direct mode communication in a TETRA system, Pmin=indicating the lowest allowed transmit power on a direct mode channel, and Pmax =indicating the highest allowed transmit power on a direct mode channel.

Thus, the X-axis indicates a theoretical communication distance corresponding to a specific transmit power level, whereas the Y-axis indicates a field strength of a transmission received, the field strength corresponding to a specific transmit power level Pmax and Pmin.

FIG. 3 shows in greater detail an example of the comparison carried out by the radio units of FIG. 1. Point 1 of FIG. 3 shows the value for a field strength measured by DMRU2 for the transmission of DMRU3 at the transmit power value Pmax indicated in the DRMU3 transmission. On the basis of the field strength value in point 1, the radio unit DMRU2 calculates the location for point 2, which indicates a theoretical distance between DMRU3 and DMRU2. The distance can be read on the X-axis as the communication distance, and it has the approximate value of 1.9 km. Consequently, it is known that DMRU3 has transmitted with the power Pmax. On the basis of the point 2, the radio unit DMRU2 calculates point 3 which indicates the field strength value which DMRU3 would receive from the DMRU2 transmission if DMRU2 were to transmit with minimum power Pmin. It is hereby assumed that the transmissions of both the radio units are attenuated equally sharply to both directions. In other words, if a move is made from point 3 along the horizontal line to the Y-axis, it is possible to read on the Y-axis in point 4 the received field strength −80 dBm.

The invention is partly based on the observation that if modulation according to TETRA specifications is employed, two signals on the same channel do not mix, if they have a large enough difference in field strength. This causes the stronger signal to pass, and the weaker signal does not interfere with the reception of the stronger signal. In the chart and example in question, the difference in field strength between the stronger and weaker signal is assumed to be 20 dB.

By moving upward in the field strength scale, for example 20 dB, from point 4 on the Y-axis, point 5 is achieved, indicating the field strength that the DMRU4 transmission should at least have at the receiver of DMRU3, i.e. a field strength of −60 dBm in order for the DMRU2 transmission not to mix with it.

To simulate the worst possible situation in which the transmit power of DMRU4 is the lowest allowed, i.e. Pmin, point 6 is reached from the calculated point 5 on the Y-axis, point 6 indicating the distance d1 on the Pmin curve. The d1 represents the maximum distance between DMRU4 and DMRU3 in order for the transmission of DMRU2 not to interfere with the reception of DMRU3 when DMRU4 is transmitting with the minimum power Pmin. Accordingly, it is possible to read the maximum communication distance between DMRU4 and DMRU3 on the X-axis in point d2 corresponding to point 7 on the Pmax curve, when DMRU4 is transmitting with the maximum transmit power Pmax.

Furthermore, a parameter Dmax may be set system specifically on a direct mode channel. This parameter determines the distance within which the operation of two mobile stations on the direct mode channel will probably not be interfered with traffic between other mobile stations on the same channel. Thus, the parameter Dmax determines a kind of a guard region.

In case the calculated value d1 does not fall within the system/channel specific guard region, DMRU2 may presume that its transmission will interfere neither with the transmitting mobile station DMRU3 nor other mobile stations DMRU4 communicating with DMRU3, and thus DMRU2 can begin communication.

Figure 4:
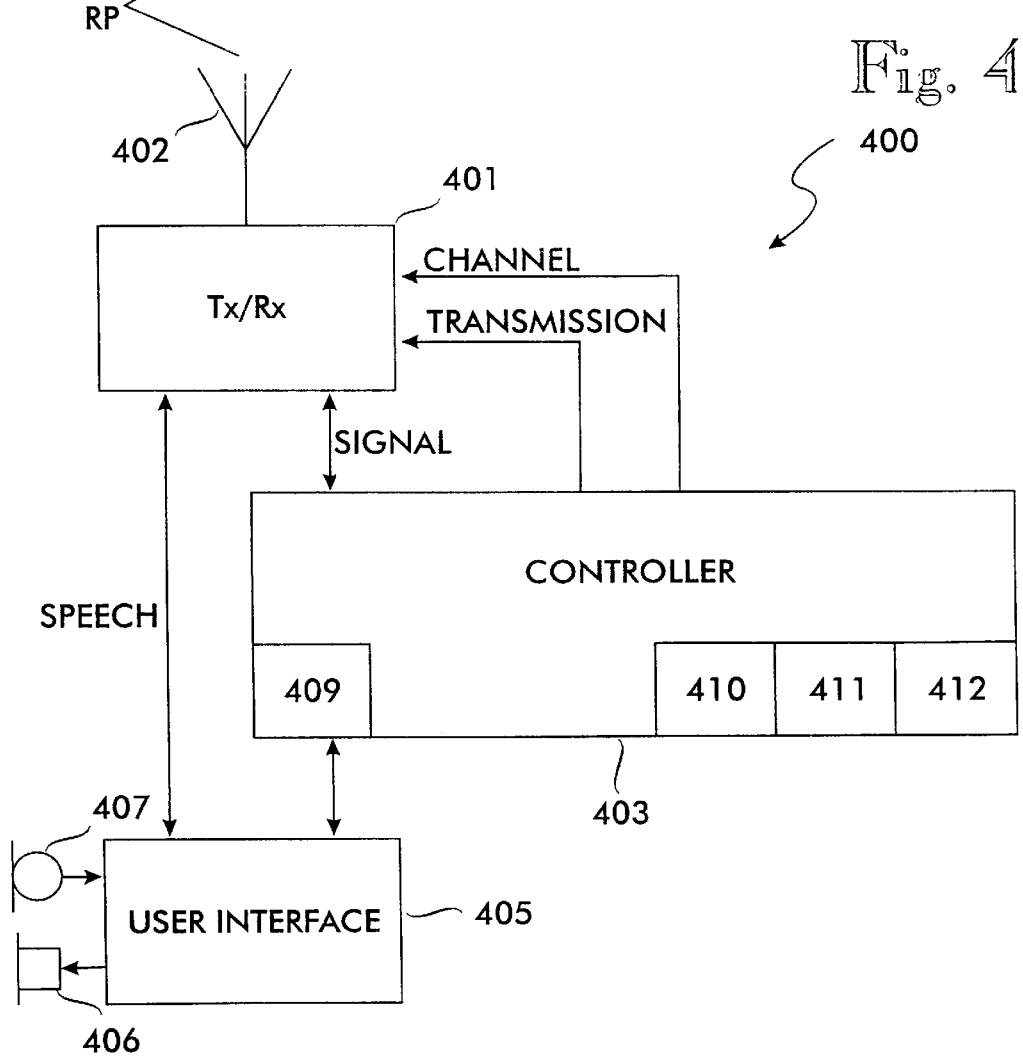
FIG. 4 is a block diagram illustration of a radio unit according to the invention.

FIG. 4 is a block diagram illustration of a radio unit according to the invention. The figure shows a typical radio unit 400 communicating on a direct mode channel, such as a subscriber-operated mobile phone, a mobile station or a subscriber station. The radio unit is also able to operate as a repeater if it contains two transmitter or transceiver units. The function of the transceiver unit (TX/RX) 401 is to match onto the radio channel employed on any one occasion. An antenna 402 is connected to the transceiver 401, the antenna having connection to the radio path RP. Usually, radio frequencies between the range 60–1000 MHz (VHF and UHF bands) are used, although other frequencies can also be used. An analog modulation may be applied on the radio path RP, whereby the modulation method is usually phase modulation. Other kinds of modulation methods may be applied as well. For signalling purposes, fast frequency shift keying modulation (FFSK), for example, may be used. Transmission on the radio path may also be digital, as is the case in systems according to the TETRA specifications.

The user interface 405 comprises an electroacoustic transducing means, typically a loudspeaker 406 and a microphone 407, and possibly buttons relating to beginning, ending and dialling a call. Because in a trunked system, and especially on a direct mode channel, conversation advantageously takes place in turns, the subscriber unit typically contains a push to talk button (PTT) which must be kept pressed down for the duration of the speaking turn. The push to talk button is not shown in FIG. 4.

The purpose of a controller 403 is to control the operation of the radio unit. The controller is connected to the user interface 405, from which it obtains impulses relating to, for example, the call initiation and termination. Through the user interface 405, the controller 403 may also provide the user with voice/sound or visual symbols relating to the operation of the mobile phone or the mobile radio system.

The controller 403 is connected to the transceiver TX/RX 401. The channel employed by the transceiver is determined by the controller 403, meaning that the transceiver tunes onto a channel, i.e. radio frequency and an appropriate time slot, determined by the controller 403. The radio unit according to the invention tunes onto a direct mode channel, particularly. The transceiver 401 is also switched on controlled by the controller 403. The controller 403 receives and transmits signalling messages by means of the transceiver 401. A radio unit 400, DMRU1 DMRU4 (FIG. 1) according to the invention, may be used, for example, in a mobile communication system, i.e. a radio system, comprising a radio network which has at least one exchange, a base station and subscriber stations, and possibly one or more repeater stations forwarding traffic between at least one base station and subscriber stations communicating on a direct mode channel. The radio unit contains a transceiver unit 401 for receiving transmissions transmitted by other radio units, and for transmitting the transmissions to the other radio units, a control unit 403 for controlling the radio unit functions, and a user interface 405. The radio unit may additionally include a memory means 411 for storing information it requires.

The radio unit 400, DMRU2 according to the invention further comprises a quality monitoring means 409 responsive to the transmissions transmitted by other radio units DMRU1, DMRU3 and DMRU4 for monitoring 204 the quality of transmissions transmitted by the other radio units, and for producing information proportional to the quality, and for determining the transmit power of the other radio units on the basis of their transmission, and comparing means 410 responsive to the monitoring means 409 for comparing the transmissions received from other radio units and the transmit power used for these transmissions to the transmit power intended to be used by the radio unit itself, and on the basis of the comparison for inferring (209, FIG. 2) whether the radio unit may begin to operate on the direct mode channel.

The radio unit 400 according to the invention is arranged, on the basis of the above comparison 410 (209, FIG. 2), to begin 211 to transmit on the direct mode channel, if the quality of the transmission received by the radio unit 400 from another radio unit is lower 208 than a specific threshold value, and the transmit power of said other radio unit exceeds a specific threshold value in relation to the intended transmit power of the radio unit 400.

The radio unit according to the invention is arranged, on the basis of the above comparison, to continue monitoring transmissions of other radio units on the direct mode channel, if the quality of the transmission received by the radio unit from another radio unit exceeds a specific threshold value, and the transmit power of the other radio unit exceeds a specific threshold value in relation to the intended transmit power of the radio unit.

On the basis of the above comparison, the radio unit according to the invention is additionally arranged to adjust its transmit power to such a level that the transmission does not interfere with the transmission of the first radio unit already transmitting on the direct mode channel, and to begin its transmission on the direct mode channel.

The monitoring means 409 according to the radio unit of the invention is arranged to monitor the field strengths and/or message error ratios of transmissions 101, 110 transmitted by other radio units DMRU1, DMRU3.

The radio unit 400 according to the invention further comprises means 412 for including the transmit power information into its transmission, whereby the other radio units receiving the transmissions infer in response to the transmit power information, whether they may begin to transmit on the direct mode channel.

The drawings and the description relating thereto are only intended to illustrate the idea of the invention. In details, the method and radio unit according to the invention may vary within the scope of the claims. Although the invention is above described mainly in connection with trunked radio systems, the invention can also be applied to other kinds of radio systems.

We claim:

1. A method for communicating on a direct mode channel on which there is at least one communicating first radio unit, and a second radio unit which is equipped with a memory and which seeks to communicate on said direct mode channel with an intended transmit power, comprising the steps of:

one said radio unit transmitting a transmission on said direct mode channel, and information in said transmission on the transmit power said one first radio unit is using, said second radio unit monitoring transmissions on the direct mode channel, and as a consequence of said monitoring receiving the transmission of said one first radio unit, and said second radio unit storing in said memory said information as to the transmit power as contained in the transmission of said one first radio unit, said second radio unit measuring the quality of the transmission of said one first radio unit, and storing information characterizing said quality in said memory, as quality information, and said second radio unit comprising said quality and transmit power information of said one first radio unit to said intended transmit power, and, as a result of said comparing, said second radio unit inferring whether said second radio unit can start transmitting on said direct mode channel.

2. The method as claimed in claim 1, further comprising:

on the basis of said comparing, said second radio unit beginning to transmit on said direct mode channel, if the quality of the transmission received by said second radio unit from said one first radio unit is lower than a specific threshold value, and the transmit power of said one first radio unit exceeds a specific threshold value in relation to said intended transmit power of said second radio unit.

3. The method as claimed in claim 1, further comprising:

on the basis of said comparing, said second radio unit continuing monitoring transmissions on said direct mode channel, if the quality of said transmission received by said second radio unit from said one first radio unit exceeds a specific threshold value, and the transmit power of said one first radio unit exceeds a specific threshold value in relation to said intended transmit power of said second radio unit.

4. The method as claimed in claim 1, further comprising:

on the basis of said comparing, said second radio unit adjusting transmit power of said second radio unit to such a level that transmission by said second radio unit does not interfere with transmission by said one first radio unit, and said second radio unit beginning to transmit on said direct mode channel.

5. The method as claimed in claim 1, wherein:

said measuring of the quality of the transmission of said one first radio unit includes measuring the field strength of the transmission of said one first radio unit as received by said second radio unit.

6. The method as claimed in claim 1, wherein:

said measuring of the quality of the transmission of said one first radio unit includes measuring the message error ratio of the transmission of said one first radio unit as received by said second radio unit.

7. A radio unit communicating on a direct mode channel, comprising:

a transceiver unit for communicating with other radio units, a control unit, a user interface, a memory means, a quality monitoring means responsive to transmissions respectively transmitted by said other radio units for monitoring the quality of said transmissions transmitted by said other radio units, and for producing information proportional to said quality, and for determining the respective transmit powers of said other radio units on the basis of their respective transmissions, and comparing means responsive to said monitoring means for comparing respective ones of said transmissions received from said other radio units and the transmit powers respectively used for these transmission to a transmit power intended to be used by said radio unit, and, on the basis of results from said comprising, inferring whether said radio unit may begin to operate on said direct mode channel.

8. The radio unit as claimed in claim 7, further comprising:

said radio unit being arranged, on the basis of, results of said comparing, to begin to transmit on said direct mode channel, if the quality of the transmission received by said radio unit from a respective one of said other radio units is lower than a specific threshold value, and the transmit power of said other radio unit exceeds a specific threshold value in relation to said intended transmit power of said radio unit.

9. The radio unit as claimed in claim 7, further comprising:

said radio unit being arranged, on the basis of results of said comparing, to continue monitoring transmissions of said other radio units on said direct mode channel, if the quality of the respective transmission received by said radio unit from said radio unit exceeds a specific threshold value, and the transmit power of said other radio unit exceeds a specific threshold value in relation to said intended transmit power of said radio unit.

10. The radio unit as claimed in claim 7, further comprising:

said radio unit being arranged on the basis of results of said comparing, to adjust transmit power of said radio unit to such a level that transmission by said radio unit does not interfere with the transmission of a respective other said radio unit already transmitting on the direct mode channel, and to begin transmitting on said direct mode channel.

11. The radio unit as claimed in claim 7, wherein:

said quality monitoring means is arranged to monitor the field strengths of transmissions said radio unit has received from respective ones of said other radio units.

12. The radio unit as claimed in claim 7, wherein:

said quality monitoring means is further arranged to monitor the message error ratios of transmissions said radio unit has received from respective ones of said other radio units.

13. A radio unit communicating on a direct mode channel, the radio unit comprising:
- a transceiver unit for communicating with other radio units by transmissions on said direct mode channel,
- a control unit,
- a user interface,
- means for including in said transmissions respective information as to transmit power being used by said radio unit, whereby other radio units receiving the transmissions are enabled to infer, in response to reception of the transmit power information, whether respective ones of said other radio units may begin to transmit on said direct mode channel.

14. A radio unit communicating on a direct mode channel, comprising:
- a transceiver unit for communicating with other radio units by respective transmissions,
- a control unit,
- a user interface,
- a memory means,
- a quality monitoring means responsive to transmissions transmitted by other radio units for monitoring the quality of transmissions transmitted by said other radio units, and for producing information proportional to said quality, and for determining the respective transmit powers of said other radio units on the basis of respective transmissions of said other radio units on said direct mode channel,
- comparing means responsive to said monitoring means for comparing respective ones of the transmissions received from the other radio units, and the transmit powers respectively used for these transmissions, to a transmit power intended to be used by said radio unit, and, on the basis of results of said comparing, inferring whether said radio unit may begin to operate on said direct mode channel, and
- means for including into transmissions by said radio unit on said direct mode channel transmit power information as to the transmit power that said radio unit is using.

15. The radio unit as claimed in claim 14, wherein:
the radio unit is arranged, on the basis of results of said comparing, to begin to transmit on said direct mode channel, if the quality of a transmission received by said radio unit from another radio unit on said direct mode channel is lower than a specific threshold value, and the transmit power of said other radio unit exceeds a specific threshold value in relation to said intended transmit power of said radio unit.

16. The radio unit as claimed in claim 14, wherein:
said radio unit is arranged, on the basis of results of said comparing, to continue monitoring transmissions of the other radio units on said direct mode channel, if the quality of a transmission received by said radio unit from another radio unit exceeds a specific threshold value, and the transmit power of said other radio unit exceeds a specific threshold value in relation to said intended transmit power of said radio unit.

17. The radio unit as claimed in claim 14, wherein:
on the basis of results of said comparing, said radio unit is arranged to adjust transmit power thereof to such a level that transmission by said radio unit on said direct mode channel does not interfere with transmission of a respective other radio unit already transmitting on said direct mode channel, and to begin transmission by said radio unit on said direct mode channel.

18. The radio unit as claimed in claim 14, wherein:
said quality monitoring means is arranged to monitor the field strengths of transmissions which said radio unit has received from other radio units on said direct mode channel.

19. The radio unit as claimed in claim 14, wherein:
said quality monitoring means is arranged to monitor the message error ratios of transmissions which said radio unit has received from other radio units on said direct mode channel.

* * * * *